(12) United States Patent
Sazegari et al.

(10) Patent No.: US 11,748,098 B2
(45) Date of Patent: Sep. 5, 2023

(54) ADLER ASSIST INSTRUCTIONS

(71) Applicant: Apple Inc., Cupertino, CA (US)

(72) Inventors: Ali Sazegari, Los Altos, CA (US); Chris Cheng-Chieh Lee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/308,738

(22) Filed: May 5, 2021

(65) Prior Publication Data
US 2022/0357947 A1 Nov. 10, 2022

(51) Int. Cl.
*G06F 9/30* (2018.01)
*G06F 11/10* (2006.01)

(52) U.S. Cl.
CPC ...... *G06F 9/30036* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 5,960,012 A | 9/1999 | Spracklen | |
| 6,446,193 B1 * | 9/2002 | Alidina | G06F 9/3885 712/7 |
| 7,415,653 B1 * | 8/2008 | Bonwick | G06F 11/1004 714/763 |
| 8,112,691 B1 | 2/2012 | Spracklen | |
| 8,271,648 B2 | 9/2012 | Fahey et al. | |
| 8,453,035 B1 | 5/2013 | Spracklen | |
| 9,983,851 B1 * | 5/2018 | Diamant | G06F 7/727 |
| 10,671,389 B2 | 6/2020 | Bradbury et al. | |
| 2014/0208078 A1 * | 7/2014 | Bradbury | G06F 11/1004 712/222 |

(Continued)

OTHER PUBLICATIONS

Adenilson Cavalcanti,"Optimizing Zlib on Arm: The power of Neon", The Linux Foundation, Open Source Summit, received from https://events19.linuxfoundation.org/wp-content/uploads/2017/11/Optimizing-Zlib-on-ARM-The-Power-of-NEON-Adenilson-Cavalcanti-ARM.pdf, 2018, 44 pages.

(Continued)

*Primary Examiner* — John M Lindlof
(74) *Attorney, Agent, or Firm* — Aikin & Gallant, LLP

(57) ABSTRACT

A processor is provided with a register file comprising a plurality of vector registers, and an execution core coupled to the register file, where the execution core is configured to execute a set of checksum instructions with a first checksum instruction to specify a first vector operand, a second vector operand, and a result vector operand, where the first vector operand is in a first vector register of the plurality of vector registers, the second vector operand is in a second register of the plurality of vector registers, and the result vector operand is to be written to a third vector register of the plurality of vector registers, and to execute the first checksum instruction, the execution core is configured to accumulate bytes from the first vector operand and the second vector operand into a first portion of the result vector operand and add the accumulated bytes from the first vector operand and the second vector operand to a second portion of the result vector operand to generate the second portion written to the result vector operand.

15 Claims, 11 Drawing Sheets

(56) References Cited

U.S. PATENT DOCUMENTS

2017/0250710 A1  8/2017  Asanaka et al.

OTHER PUBLICATIONS

Adenilson Cavalcanti, "Neon Intrinsics Case Study: Optimizing PNG Performance in Chromium", Version 2.0, received from https://developer.arm.com/-/media/Arm%20Developer%20Community/PDF/Neon%20Programmers%20Guide/NeonCaseStudy-PNG_Chromium.pdf?revision=f51220d9-81bf-40cd-ab9c-2bc612dbda23, released Dec. 20, 2019, 19 pages.

* cited by examiner adler16 Vd, Vn

Source Vector Vn

| b[0] | b[1] | b[2] | b[3] | b[4] | b[5] | b[6] | ... | b[15] |

Adler Result Vector Vd.s[0]

| Vd.s[0] + Vn.b[0] + Vn.b[1] +... + Vn.b[15] |

Sum2 Result Vector Vd.s[1]

| Vd.s[1] + 16*Vn.s[0] + 16*Vn.b[0] + ...+1*Vn.b[15] |

*FIG. 3* adler32 Vd, Vn, Vm

Source Vector Vn — 402

| b[0] | b[1] | b[2] | b[3] | b[4] | b[5] | b[6] | ... | b[15] |

Source Vector Vm — 404

| b[0] | b[1] | b[2] | b[3] | b[4] | b[5] | b[6] | ... | b[15] |

Adler Result Vector Vd.s[0] — 406

Vd.s[0] + Vn.b[0] + Vn.b[1] +... + Vn.b[15] + Vm.b[0] + Vm.b[1] +... + Vm.b[15]

Sum2 Result Vector Vd.s[1] — 408

Vd.s[1] + 32*Vn.s[0] + 32*Vn.b[0] + ...+1*Vn.b[15] + 32*Vm.b[0] + ...+1*Vm.b[15]

*FIG. 4* mod_base Vd, Vn, Vm

Source Vector Vn

| b[0] | b[1] | b[2] | b[3] | b[4] | b[5] | b[6] | ... | b[32] |

502

Source Vector Vm

| b[0] | b[1] | b[2] | b[3] | b[4] | b[5] | b[6] | ... | b[32] |

504

Result Vector Vd

506

| Vn Modulo Vm[0] = Vn.b[0-15] * Vm[1], shift right Vd, Vd -Vd*Vm[0] |

```
        ( Start mod_base )
                │
                ▼                                    ╱ 802
┌─────────────────────────────────────────────┐
│     Receive a first vector operand of bytes │
└─────────────────────────────────────────────┘
                │
                ▼                                    ╱ 804
┌─────────────────────────────────────────────┐
│ Multiply a first set of vector elements of a first vector operand by at least one │
│ vector element of a second vector operand to generate a vector written to the │
│ result vector operand │
└─────────────────────────────────────────────┘
                │
                ▼                                    ╱ 806
┌─────────────────────────────────────────────┐
│     Shifting the result vector operand by a defined value │
└─────────────────────────────────────────────┘
                │
                ▼                                    ╱ 808
┌─────────────────────────────────────────────┐
│ Multiplying the result vector operand by at least one vector element of the │
│ second vector operand to generate a subtraction value and subtracting the │
│ subtraction value from the result vector operand │
└─────────────────────────────────────────────┘
                │
                ▼
        ( Stop mod_base )
```

*FIG. 8*

ADLER ASSIST INSTRUCTIONS

BACKGROUND

Field

Embodiments described herein are related to processors and, more particularly, to hardware assist instructions to improve compression/decompression performance and power efficiency.

Background Information

Compression is used for a variety of reasons in computing devices. For example, software downloads may be compressed for delivery over a network, and may be decompressed on the target computing device for installation. In some cases, such as portable computing devices (e.g. smart phones, portable digital assistants, tablet computers, etc.), the software may be decompressed, installed, then recompressed for storage on the device. Storing various software in compressed form may save storage space on the device, which may be more limited than the storage in larger computing devices such as laptops, desktops, servers, etc.

Errors, such as channel impairment, hardware failures, and software errors, may occur and must be detected before a computer system falls into a potentially catastrophic state. Checksum algorithms are used to produce a fixed size datum that may be computed from data and is used to verify the integrity of a data and/or a system. Adler-32 is a simple operation that is a form of checksum using scalar operations, and as compared to other checksum algorithms, such as cyclic redundancy check (CRC-32), it trades reliability for speed. Adler-32 is obtained by calculating two 16-bit checksums and concatenating their bits into a 32-bit integer.

SUMMARY

In an embodiment, a processor is provided with a register file comprising a plurality of vector registers, and an execution core coupled to the register file, where the execution core is configured to execute a set of checksum instructions with a first checksum instruction to specify a first vector operand, a second vector operand, and a result vector operand, where the first vector operand is in a first vector register of the plurality of vector registers, the second vector operand is in a second register of the plurality of vector registers, and the result vector operand is to be written to a third vector register of the plurality of vector registers, and to execute the first checksum instruction, the execution core is configured to accumulate bytes from the first vector operand and the second vector operand into a first portion of the result vector operand and add the accumulated bytes from the first vector operand and the second vector operand to a second portion of the result vector operand to generate the second portion written to the result vector operand. In some embodiments, the first vector operand is a source vector of bytes from a data source buffer.

The execution core is further configured to execute a second instruction from the set of checksum instructions, wherein to execute the second checksum instruction, the execution core is further configured to specify a third vector operand, and a second result vector operand, wherein the third vector operand is in a fourth vector register of the plurality of vector registers and the second result vector operand is to be written to a fifth vector register of the plurality of vector registers, wherein the execution core is configured to accumulate bytes from the third vector operand into a first portion of the second result vector operand and add the accumulated bytes in the first portion of the second result vector to the second portion of the second result vector operand to generate the second portion written to the second result vector operand. In some embodiments, concatenating the first portion of the result vector operand and the second portion of the result vector operand generates a checksum result, the checksum result comprises a computation for a fixed size datum. In an embodiment, the data source buffer is compressed data. In some embodiments, the execution core is further configured to execute a third instruction, the execution core is further configured to specify a fourth vector operand, a fifth vector operand, and a third result vector operand, wherein the fourth vector operand is in a sixth vector register of the plurality of vector registers, the fifth vector operand is in a seventh register, and the third result vector operand is to be written to an eighth vector register of the plurality of vector registers, wherein the execution core is configured to multiply a first portion of vector elements of a fourth vector operand by at least one vector element of a fifth vector operand to generate a vector written to the third result vector operand, shift the third result vector operand by a defined value, and multiply the third result vector operand by at least one vector element of the fifth vector operand to generate a subtraction value and subtracting the third result vector operand by the subtraction value. In an embodiment, the defined value is computed to prevent overflow. In an embodiment, the execution core is further configured to execute the first instruction consecutively with a block from a set of consecutive blocks from a data source, wherein each block from the set has a defined number of bytes, and wherein the execution of the first instruction with the block to generate the result vector written to the sixth vector register of the register file, and execute the third instruction in response to completing the consecutive execution of the first instruction with the block.

In an embodiment, a non-transitory machine-readable medium storing instructions executed to cause one or more processors of a data processing system to perform operations, the instructions comprising a first checksum instruction from a set of checksum instructions configured to execute, the first checksum instruction specifying a first vector operand, a second vector operand, and a result vector operand, wherein the first vector operand is in a first vector register of a plurality of vector registers, the second vector operand is in a second register of the plurality of registers, and the result vector operand is to be written to a third vector register of the plurality of vector registers, wherein to execute the first checksum instruction, the execution core is further configured to accumulate bytes from the first vector operand and the second vector operand into a first portion (optional: of vector elements) of the result vector operand and add the accumulated bytes from the first vector operand and the second vector operand to a second portion of the result vector operand to generate the second portion written to the result vector operand.

In yet another embodiment, a processor comprises a register file comprising a plurality of vector registers, and an execution core coupled to the register file, wherein the execution core is configured to execute a first checksum instruction from a set of checksum instructions, the first checksum instruction to specify a first vector operand, a second vector operand, and a result vector operand, wherein the plurality of vector registers includes a first vector register to store the first vector operand, a second vector register to store the second vector operand, and a third vector register to store the result vector operand, wherein to execute the first checksum instruction, the execution core is further configured to accumulate bytes from the first vector register and the second vector register into a first portion of the third vector register associated with the result vector operand and add the accumulated bytes to a second portion of the third vector register, and output a value of the third vector register.

BRIEF DESCRIPTION OF THE DRAWINGS

FIG. 3 is a block diagram for a vectorized checksum algorithm in accordance with an embodiment.

FIG. 4 is a block diagram for a vectorized checksum algorithm in accordance with an embodiment.

FIG. 5 is a block diagram for a vectorized checksum algorithm in accordance with an embodiment.

FIG. 8 is a flowchart illustrating operation to execute the mod_base instruction in accordance with an embodiment.

DETAILED DESCRIPTION

Embodiments describe hardware instruction assists for a vectorized checksum algorithm. Hardware instruction assists may use a software wrapper to call the hardware assist instructions. The hardware instruction assists may be viewed as being part of an instruction set architecture level and is not tied to a particular hardware implementation. The hardware instruction assist is used with a software wrapper to encapsulate the vectorized checksum algorithm and can be interrupted by the processor to handle other instructions. The use of hardware instruction assists for the vectorized checksum algorithm may improve performance and expend less energy. In some embodiments, the hardware assist instructions may be used with a compression algorithm in order to check the integrity of the data received.

In particular, each checksum hardware instruction assist provides techniques that allow performance with a single instruction (and in some embodiments, a single cycle) functions of checks on integrity of data. This is an improvement over prior approaches that required more instructions and cycles.

In various embodiments, description is made with reference to figures. However, certain embodiments may be practiced without one or more of these specific details, or in combination with other known methods and configurations. In the following description, numerous specific details are set forth, such as specific configurations, dimensions and processes, etc., in order to provide a thorough understanding of the embodiments. In other instances, well-known semiconductor processes and manufacturing techniques have not been described in particular detail in order to not unnecessarily obscure the embodiments. Reference throughout this specification to "one embodiment" means that a particular feature, structure, configuration, or characteristic described in connection with the embodiment is included in at least one embodiment. Thus, the appearances of the phrase "in one embodiment" in various places throughout this specification are not necessarily referring to the same embodiment. Furthermore, the particular features, structures, configurations, or characteristics may be combined in any suitable manner in one or more embodiments.

Figure 1:
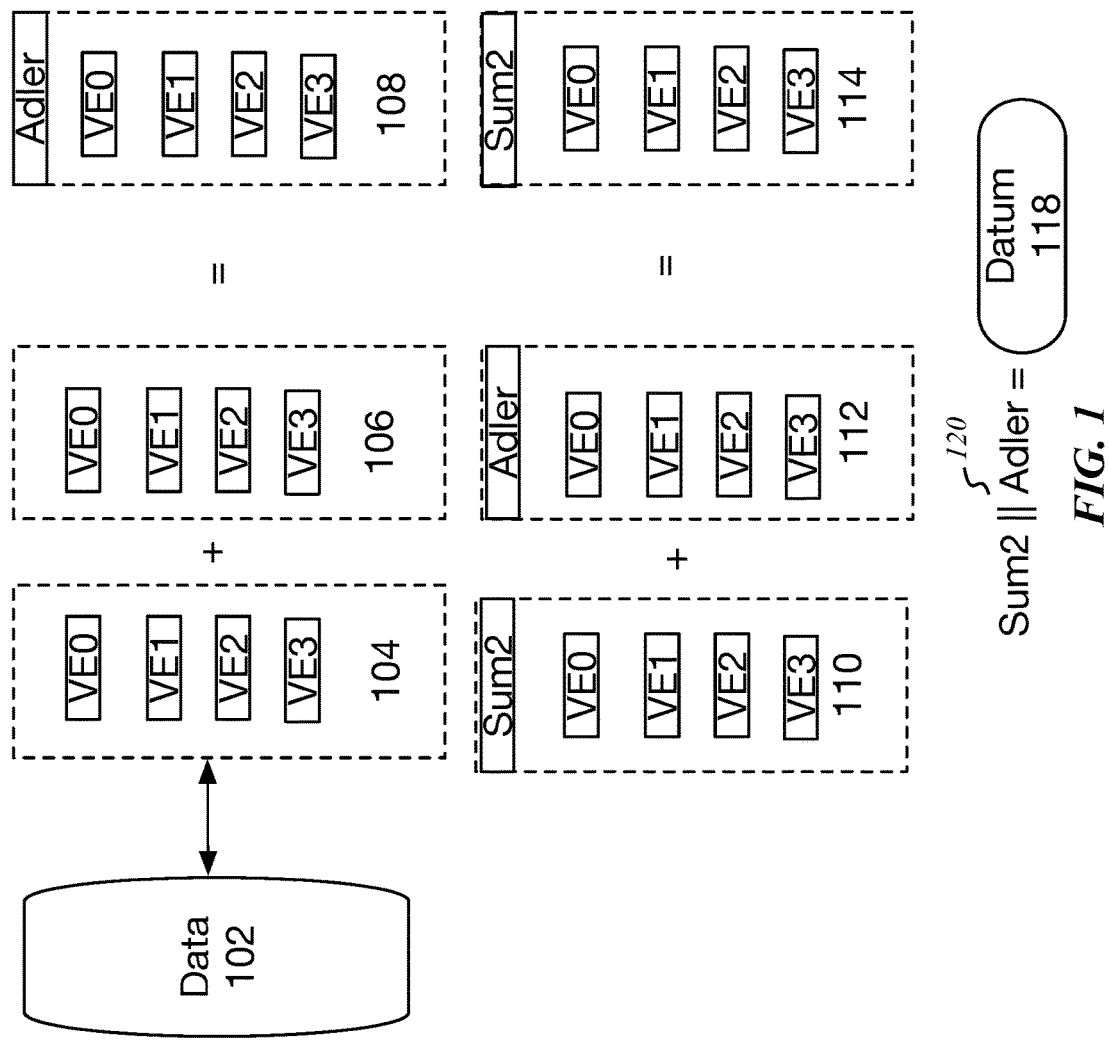
FIG. 1 is a block diagram for a vectorized checksum algorithm in accordance with an embodiment.

FIG. 1 is a block diagram for a vectorized checksum algorithm in accordance with an embodiment. As shown, data 102 may be processed to create a datum 118 for an integrity check. As shown, data 102 stored in a buffer may be processed using vectorized operations as opposed to scalar operations.

Generally, vector operations perform a specified operation on a plurality of vector elements in one or more vector operands in parallel and independently for each vector element. For example, a vector add operation may add vector elements in corresponding positions within the vector operands, producing sums as vector elements of a vector result operand. A four element vector would have vector elements VE0, VE1, VE2, and VE3, in the listed order in adjacent vector element positions within the vector. A vector add would add the VE0 elements of the source operands to produce the VE0 element of the result operand; add the VE1 elements of the source operands to produce VE1 element of the result operand; etc. While a four element vector is used as an example, other embodiments may employ different numbers of vector elements per vector and/or may support multiple numbers of vector elements per vector. For example, a 128 bit vector register set could support 2 64-bit vector elements, 4 32-bit vector elements, 8 16-bit vector elements, and 16 8-bit vector elements. Various vector instructions may be defined to use the vector registers as vector elements of different sizes. Thus, vector operations/ instructions perform well on vector elements that are the same size, and many operations may be performed in parallel to improve performance of vectorizable algorithms.

Continuing with FIG. 1, corresponding vector elements of 104 and 106 with data from 102 may be accumulated and stored in a checksum variable "Adler" 108 for the checksum algorithm. The accumulated bytes from Adler 108 may be added to previously accumulated bytes stored in a checksum variable "Sum2" 110 and 114. Pseudocode for the operations is provided as follows:

```
uint32_t adler; // initial adler < 65521
uint32_t sum2; // initial sum2 < 65521
for (i=0;i<5552;i++) {
    adler += (uint32_t) *buf++;
    sum2 += adler;
}
    adler = ((uint32_t) adler + *buf++) % 65521;
    sum2 = ((uint32_t) sum2 + adler) % 65521;
```

A modulo operation is performed on Sum2 and Adler variables to prevent overflow errors, and the variables are concatenated 120 together to form a datum 118. The datum 118 may be used verify the integrity of the data. For example, the datum 118 may be compared against an expected value for the datum 118.

Figure 2:
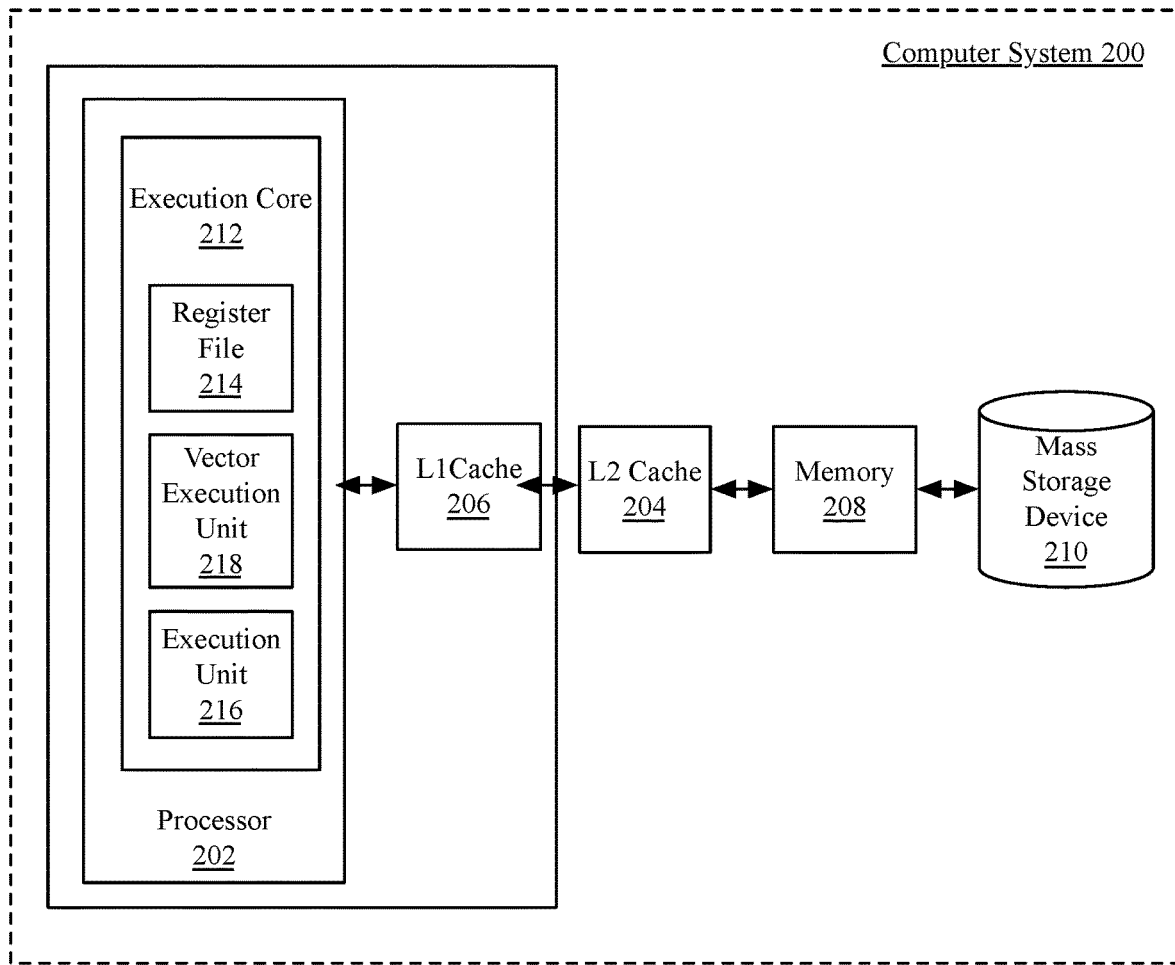
FIG. 2 is a block diagram of one embodiment of a computer system in accordance with an embodiment.

FIG. 2 is a block diagram of one embodiment of a computer system 200. The computer system 200 includes a processor 202, a level two (L2) cache 204, a memory 208, and a mass-storage device 210. As shown, the processor 202 includes a level one (L1) cache 206 and an execution core 212 coupled to the L1 cache 206 and a register file 214. The execution core 212 may include one or more execution units (e.g., 216 and 218) such as an integer execution unit, a floating point (FP) execution unit, and a vector execution unit 218, as shown. The execution units 216 and 218 may be coupled to the register file 214, and/or there may be multiple register files 214 for different operand types, in various embodiments. It is noted that although specific components are shown and described in computer system 200, in alternative embodiments different components and numbers of components may be present in computer system 200. For example, computer system 200 may not include some of the memory hierarchy (e.g., L2 cache 104, memory 108 and/or mass-storage device 210). Multiple processors similar to the processor 202 may be included. Multiple execution units of a given type (e.g. integer, floating point, vector, load/store, etc.) may be included and the number of execution units of a given type may differ from the number of execution units of another type. Additionally, although the L2 cache 106 is shown external to the processor 202, it is contemplated that in other embodiments, the L2 cache 204 may be internal to the processor 202. It is further noted that in such embodiments, a level three (L3) cache (not shown) may be used. In addition, the computer system 200 may include graphics processors, video cards, video-capture devices, user-interface devices, network cards, optical drives, and/or other peripheral devices that are coupled to processor 202 using a bus, a network, or another suitable communication channel (all not shown for simplicity).

In various embodiments, the processor 202 may be representative of a general-purpose processor that performs computational operations. For example, the processor 202 may be a central processing unit (CPU) such as a microprocessor, a microcontroller, an application-specific integrated circuit (ASIC), or a field-programmable gate array (FPGA). The processor 202 may be a standalone component, or may be integrated onto an integrated circuit with other components (e.g. other processors, or other components in a system on a chip (SOC), etc.). The processor 202 may be a component in a multichip module (MCM) with other components.

More particularly, as illustrated in FIG. 2, the processor 202 may include the execution core 212. The execution core 212 may be configured to execute instructions defined in an instruction set architecture implemented by the processor 202. The execution core 212 may have any microarchitectural features and implementation features, as desired. For example, the execution core 212 may include superscalar or scalar implementations. The execution core 212 may include in-order or out-of-order implementations, and speculative or non-speculative implementations. The execution core 212 may include any combination of the above features. The implementations may include microcode, in some embodiments. The execution core 212 may include a variety of execution units, each execution unit configured to execute operations of various types (e.g. the integer execution unit, the floating point execution unit, the vector execution unit 218, a load/store execution unit (not shown) etc.). The execution core 212 may include different numbers of pipeline stages and various other performance-enhancing features such as branch prediction. The execution core 212 may include one or more of instruction decode units, schedulers or reservations stations, reorder buffers, memory management units, I/O interfaces, etc.

The register file 214 may include a set of registers that may be used to store operands for various instructions. The register file 214 may include registers of various data types, based on the type of operand the execution core 212 is configured to store in the registers (e.g. integer, floating point, vector, etc.). The register file 214 may include architected registers (i.e. those registers that are specified in the instruction set architecture implemented by the processor 202). Alternatively or in addition, the register file 214 may include physical registers (e.g. if register renaming is implemented in the execution core 212).

The L1 cache 206 may be illustrative of any caching structure. For example, the L1 cache 206 may be implemented as a Harvard architecture (separate instruction cache for instruction fetching and data cache for data read/write by execution units for memory-referencing ops), as a shared instruction and data cache, etc. In some embodiments, load/store execution units may be provided to execute the memory-referencing ops.

An instruction may be an executable entity defined in an instruction set architecture implemented by the processor 202. There are a variety of instruction set architectures in existence (e.g. the x86 architecture original developed by Intel, ARM from ARM Holdings, Power and PowerPC from IBM/Motorola, etc.). Each instruction is defined in the instruction set architecture, including its coding in memory, its operation, and its effect on registers, memory locations, and/or other processor state. A given implementation of the instruction set architecture may execute each instruction directly, although its form may be altered through decoding and other manipulation in the processor hardware. Another implementation may decode at least some instructions into multiple instruction operations for execution by the execution units in the processor 202. Some instructions may be micro coded, in some embodiments. Accordingly, the term "instruction operation" may be used herein to refer to an operation that an execution unit in the processor 202/execution core 212 is configured to execute as a single entity. Instructions may have a one to one correspondence with instruction operations, and in some cases an instruction operation may be an instruction (possibly modified in form internal to the processor 202/execution core 212). Instructions may also have a one to more than one (one to many) correspondence with instruction operations. An instruction operation may be more briefly referred to herein as an "op."

The mass-storage device 210, memory 208, L2 cache 204, and L1 cache 206 are storage devices that collectively form a memory hierarchy that stores data and instructions for processor 202. More particularly, the mass-storage device 210 may be a high-capacity, non-volatile memory, such as a disk drive or a large flash memory unit with a long access time, while L1 cache 206, L2 cache 204, and memory 208 may be smaller, with shorter access times. These faster semiconductor memories store copies of frequently used data. Memory 208 may be representative of a memory device in the dynamic random access memory (DRAM) family of memory devices. The size of memory 208 is typically larger than L1 cache 206 and L2 cache 204, whereas L1 cache 206 and L2 cache 204 are typically implemented using smaller devices in the static random access memories (SRAM) family of devices. In some embodiments, L2 cache 204, memory 208, and mass-storage device 210 are shared between one or more processors in computer system 200.

In some embodiments, the devices in the memory hierarchy (i.e., L1 cache 206, etc.) can access (i.e., read and/or write) multiple cache lines per cycle. These embodiments may enable more effective processing of memory accesses that occur based on a vector of pointers or array indices to non-contiguous memory addresses.

It is noted the data structures and program instructions (i.e., code) described below may be stored on a non-transitory computer-readable storage device, which may be any device or storage medium that can store code and/or data for use by a computer system (e.g., computer system 200). Generally speaking, a non-transitory computer-readable storage device includes, but is not limited to, volatile memory, non-volatile memory, magnetic and optical storage devices such as disk drives, magnetic tape, compact discs (CDs), digital versatile discs or digital video discs (DVDs), or other media capable of storing computer-readable media now known or later developed. As such, mass-storage device 210, memory 208, L2 cache 204, and L1 cache 206 are all examples of non-transitory computer readable storage media.

As mentioned above, the execution core 212 may be configured to execute vector instructions (e.g. in the vector execution unit 218). The vector instructions may be defined as single instruction-multiple-data (SIMD) instructions in the classical sense, in that they may define the same operation to be performed on multiple data elements in parallel. The data elements operated upon by an instance of an instruction may be referred to as a vector. The data elements forming the vector may be referred to as vector elements. Vector elements themselves may have any data type (e.g. integer, floating point, etc.) and more than one data type may be supported for vector elements.

In one embodiment, the register file 214 may include vector registers that can hold operand vectors and result vectors. In some embodiments, there may be 32 bit vector registers in the vector register file. However, in alternative embodiments, there may be different numbers of vector registers and/or different numbers of bits per register. Furthermore, embodiments which implement register renaming may include any number of physical registers that may be allocated to architected vector registers. Architected registers may be registers that are specifiable as operands in vector instructions.

More particularly, the vector execution unit 218 may be configured to execute the checksum assist instructions described herein (or ops decoded from the checksum assist instructions), in addition to various vector operations such as arithmetic operations, logic, operations, shifts, etc.

FIG. 3 is a block diagram 300 for a checksum instruction, for one embodiment. Each checksum may compute checksum variables with a single instruction. At the top of FIG. 3, a mnemonic for a checksum instruction, adler16, is provided with a result destination register (Vd) having one or more sets of vector elements, such as the two sets shown with 304 and 306, and a data source register (Vn) 302. The plurality of registers may be vector registers accessed from a register file 214. By way of example, the data source register 302 may be a 16 byte vector, and the result destination registers may use the first and the second 4-byte elements to write the result for computation of variables (as shown with adler 304 and sum2 306) for the checksum algorithm implemented with the checksum instruction.

The execution core 212 is configured to accumulate bytes from the source vector register 302 and add it to a first set of vector elements (Vd.s[0]) of the result vector operand 304. Then, the execution core 212 properly scales and accumulates the previous adler result (Vd.s[0] prior to the 304 operation) and the bytes from the source vector register 302 to the second set of vector elements (Vd.s[1]), which stores the result vector operand "sum2" 306. This instruction updates the adler/sum2 pair (Vd.s[0]/Vd.s[1]) in response to an input 16-byte vector in Vn, as follows:

$Vd.s[1] += (16*Vd.s[0]+16*Vn.b[0]+ \ldots +1*Vn.b[15])$;

$Vd.s[0] += (Vn.b[0]+Vn.b[1]++Vn.b[15])$.

FIG. 4 is a block diagram 400 for a checksum instruction, for one embodiment. At the top of FIG. 4, a mnemonic for a checksum instruction, adler32, is provided with a result destination register (Vd) having one or more sets of vector elements, such as two sets shown with adler 406 and sum2 408, and data source registers (Vn) 402 and (Vm) 404. The adler32 variables may be computed with a single instruction.

As shown, the execution core 212 is configured to accumulate bytes from the first vector operand 402 and the second vector operand 404 to generate a first set of vector elements of the result vector operand adler 406. In some embodiments, the first vector operand is a source vector 402 of bytes permitted for the instructions to avoid overflow from a data source buffer. Overflow may occur when an arithmetic operation attempts to create a numeric value that is outside of the range that can be supported by the register. The instruction may be executed repeatedly with a set of consecutive blocks of a defined number of bytes from the data source. By way of example, the data buffer may have data to perform the adler32 instruction 173 times with a sequence of bytes in consecutive blocks from an initial data buffer size of 5552 bytes.

Next, the accumulated bytes adler 406 are added to a second set of vector elements of the result vector operand sum2 408 to generate the second set of vector elements written to the result vector operand 408. Adler 406 and sum2 408 may have existing values such that the computed value during execution is added to a previous value of the adler 406 and sum2 408. In an embodiment, the adler32 instructions generate variable computations adler 406 and sum2 408 in the first and second four byte elements of the result operand Vd.s[0] 406 and sum2 Vd.s[1] 408. This instruction updates the adler/sum2 pair (Vd.s[0]/Vd.s[1]) in response to an input 32-byte vector in Vn and Vm.

$Vd.s[1] += (32*Vd.s[0]+32*Vn.b[0]+ \ldots +1*Vm.b[15])$;

$Vd.s[0] += (Vn.b[0]+.+Vn.b[15]+Vm.b[0]+.+Vm.b[15])$;

FIG. 5 is a block diagram 500 for a checksum instruction, for one embodiment. At the top of FIG. 5, a mnemonic for a checksum instruction, mod_base, is provided with a result destination register (Vd) 506 and data source registers (Vn) 502 and (Vm) 504. As shown, the execution core 212 is configured to perform a modulo operation by a defined number in the data source register Vm[0] 504 on the data source register 502. The defined number for the modulo operation may be the largest prime number that can be computed for the size of a register before there is a potential for an overflow with computations during execution of the instruction in accordance the respective register width or size. By way of example, the modulo operation may be performed with a defined number of 65521 to prevent an overflow of a 32 bit register with holding the result of computations for variables adler and sum2, two 16-bit variables. In this example, 65521 is the largest prime number for 2^16.

In an embodiment, the execution core 212 multiplies a first set of vector elements of a first vector operand 502 by at least one vector element of a second vector operand 504 to generate a vector written to the result vector operand 406. Each vector element of a lower or upper half of a set of vector elements 502 is multiplied by the vector element of a second vector operand 504.

Next, the result vector operand 506 is shifted by a defined shift value. By way of example, the result vector may be shifted right 47 bits. A multiply-subtract operation may be performed on the result vector operand Vd 506. By way of example, the result vector operand Vd 506 may be multiplied by at least one vector element of the second vector operand Vm[0] 504 to generate a subtraction value (e.g., Vd*Vm[0]) and the subtraction value may be subtracted from the result vector operand 506.

Figure 6:
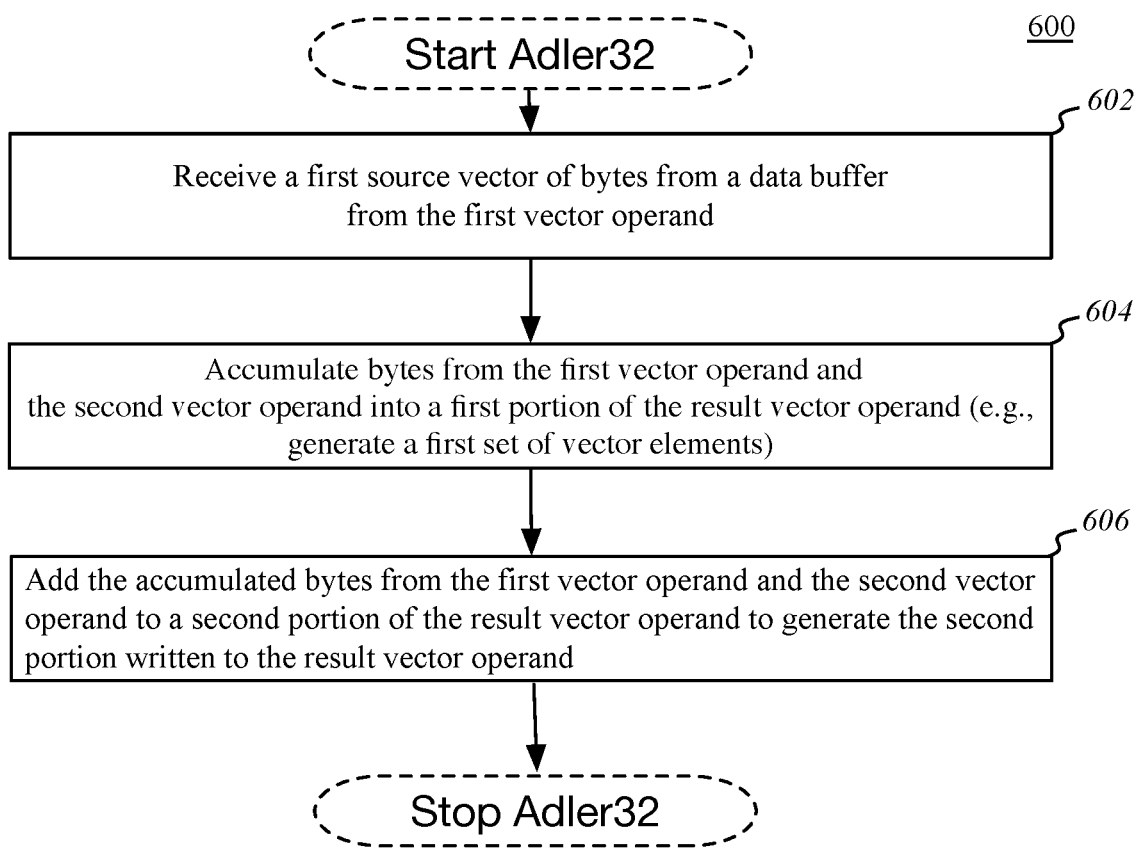
FIG. 6 is a flowchart illustrating operation to execute the adler32 instruction in accordance with an embodiment.

FIG. 6 is a flowchart 600 illustrating operation to execute the adler32 instruction. The processor 202/execution core 212 may receive a first source vector of bytes from a data buffer from the first vector operand (602). The processor 202/execution core 212 may accumulate bytes from the first vector operand and the second vector operand into a first portion of the result vector operand to generate a first set of vector elements of the result vector operand (604). The processor 202/execution core 212 may add the accumulated bytes to a second set of vector elements of the result vector operand to a second portion of the result vector operand to generate the second set of vector elements written to the result vector operand (606).

Figure 7:
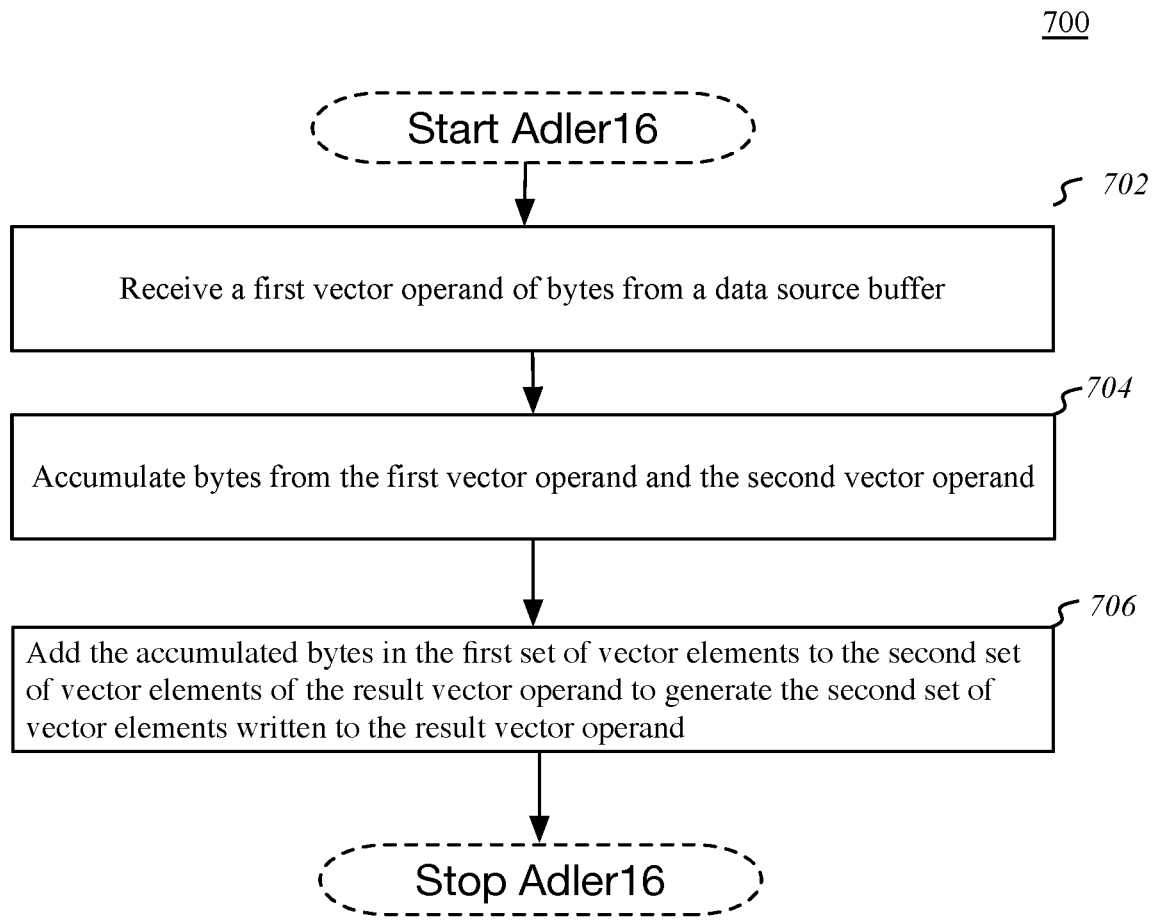
FIG. 7 is a flowchart illustrating operation to execute the adler16 instruction in accordance with an embodiment.

FIG. 7 is a flowchart 700 illustrating operation to execute the adler16 instruction. The processor 202/execution core 212 may receive a first vector operand of bytes from a data source buffer (702). The processor 202/execution core 212 may accumulate bytes from the first vector operand and the second vector operand (704). Next, the processor 202/execution core 212 add the accumulated bytes in the first set of vector elements to the second set of vector elements of the result vector operand to generate the second set of vector elements written to the result vector operand (706).

FIG. 8 is a flowchart 800 illustrating operation to execute the mod_base instruction. The processor 202/execution core 212 may receive a first vector operand of bytes from a data source buffer (802). The processor 202/execution core 212 may multiply a first set of vector elements of a first vector operand by at least one vector element of a second vector operand to generate a vector written to the result vector operand (804). Next, the processor 202/execution core 212 may shift the result vector operand by a defined value (806). The processor 202/execution core 212 may multiply the result vector operand by at least one vector element of the second vector operand to generate a subtraction value (808). The processor 202/execution core 212 may subtract the subtraction value from the result vector operand (808).

Figure 9:
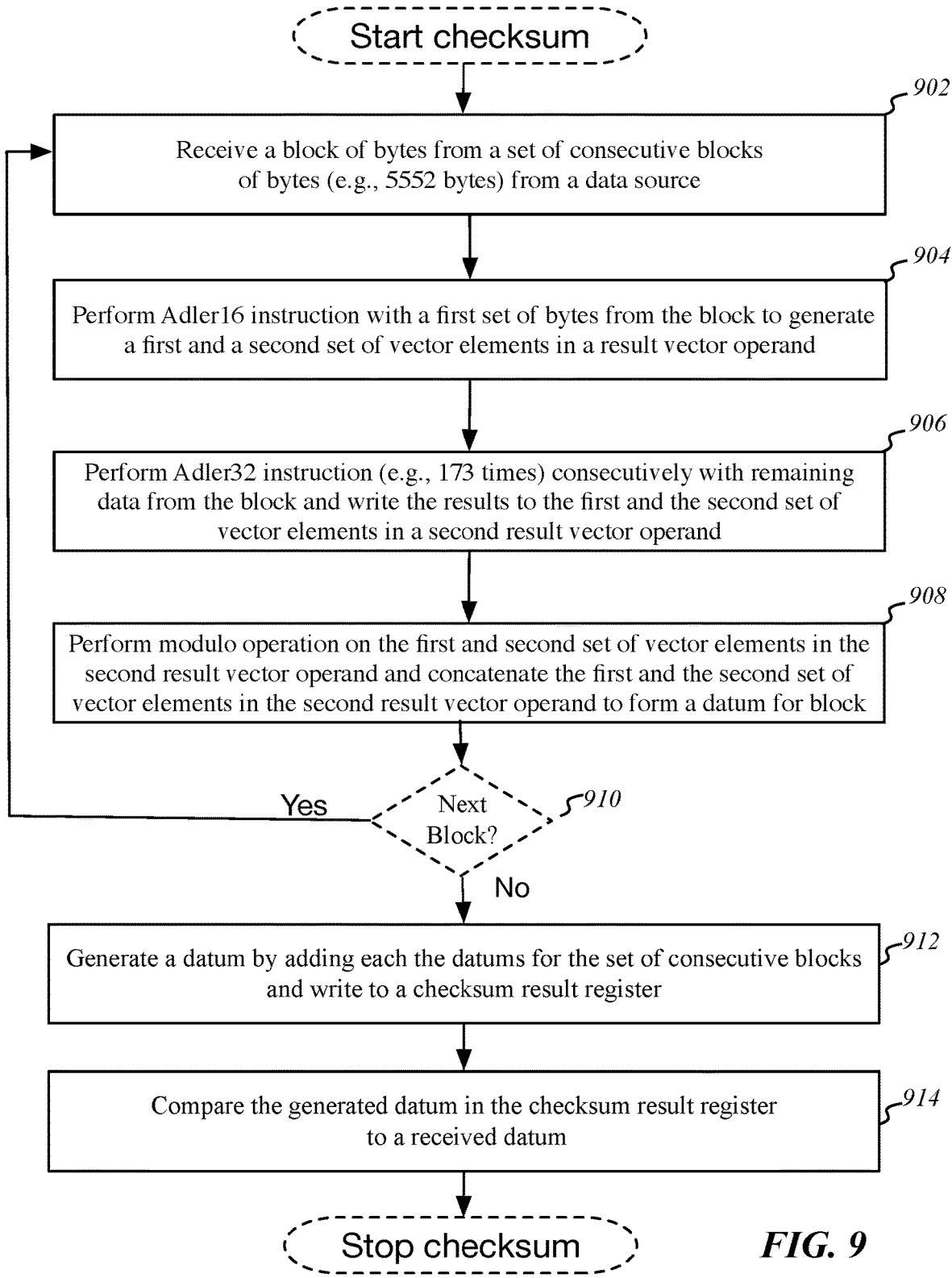
FIG. 9 is a flowchart illustrating operation to execute instructions for a checksum algorithm.

FIG. 9 is a flowchart 900 illustrating operation to execute instructions for a checksum algorithm. Initially, the processor 202/execution core 212 may receive a block of bytes from a set of consecutive blocks of bytes from a data source 102 (902). The input data for the checksum may be broken into a set of consecutive blocks for computing the checksum to avoid errors, such as overflow, 2-byte errors, and/or minimize expensive operations. 2-Byte errors are a class of errors that may result in leaving a computation result as unchanged. In some embodiments, the modulo operations may be viewed as an expensive operation in regards to the time it takes for computation. As such, the mod_base modulo operation can be performed at the end of each consecutive block, in this example, as opposed to following every computation of adler and sum2.

By way of example, if the maximum value for variables (e.g., sum2 and adler) is 65520, and the input bytes maximum value is 255, then the largest n such that 255*n*(n+1)/2+(n+1) (65520)<2^32 to allow for no overflow during computations with an unsigned 32 bit integer. Continuing with this example, a long sequence of bytes may be broken into consecutive blocks of 5552 bytes and the modulo instruction mod_base may be performed.

After receipt of the block of bytes, the processor 202/execution core 212 may perform an adler16 instruction with a first set of bytes from the block to generate a first and a second set of vector elements in a result vector operand (904). With a block size of 5552 bytes example, the adler16 instruction may be performed once with an input of a 16 byte vector and the remaining data in the block may be processed with the adler32 instruction. As indicated above, the adler16 instruction may have the execution core configured to accumulate bytes from the first vector operand into a first set of vector elements of the second result vector operand and add the accumulated bytes in the first set of vector elements to the second set of vector elements of the second result vector operand to generate the second set of vector elements written to the second result vector operand. In one embodiment, the result vector operand values may be an input to the subsequent adler32 instructions such that the adler and the sum2 variables will have input values.

Next, the processor 202/execution core 212 may perform adler32 instructions (e.g., 173 times) consecutively with remaining data from the block and write the result to the first and the second set of vector elements in the result vector operand (906). In some embodiments, the main loop of four instructions may be executed in a one cycle/iteration. With the new instructions, a possible code snipped for updating the adler/sum2 pair is as follows:

|  | ld1.4s | {Vn},[buf], #16 |
|---|---|---|
|  | adler16 | Vd, Vn |
|  | mov | nvec, #173 |
| 0: | ld1.4s | {Vn, Vm},[buf], #32 |
|  | adler32 | Vd, Vn, Vm |
|  | subs | nvec, nvec, #1 |
|  | b.gt | 0b |

The processor 202/execution core 212 performs a mod_base modulo operation on the first and the second set of vector elements in the result vector operand (908) to perform the mod_base operation on adler and sum for the block. The processor 202/execution core 212 may execute a first modulo instruction on the first set of vector elements to generate the first set of vector elements written to the result vector operand and a second modulo instruction on the second set of vector elements to generate the second set of vector elements written to the result vector operand.

The processor 202/execution core 212 may concatenate the first and the second set of vector elements in the result vector operand to form a datum for the block (908). The processor 202/execution core 212 may execute a concatenate instruction on the first set of vector elements and the second set of vector elements to generate a checksum result. The checksum result may be a computation for a fixed size datum used to verify the integrity of the block. If there are more blocks to process (910), then process continues with receiving more blocks (902).

Alternatively, if there are no further blocks to process (910), a datum is generated by adding each of the block datums for the set of consecutive blocks and the result is written to a checksum result register (912). Next, the generated datum in the checksum result register may be compared to a received datum (914) to verify the integrity of the data that processed with the checksum algorithm.

Figure 10:
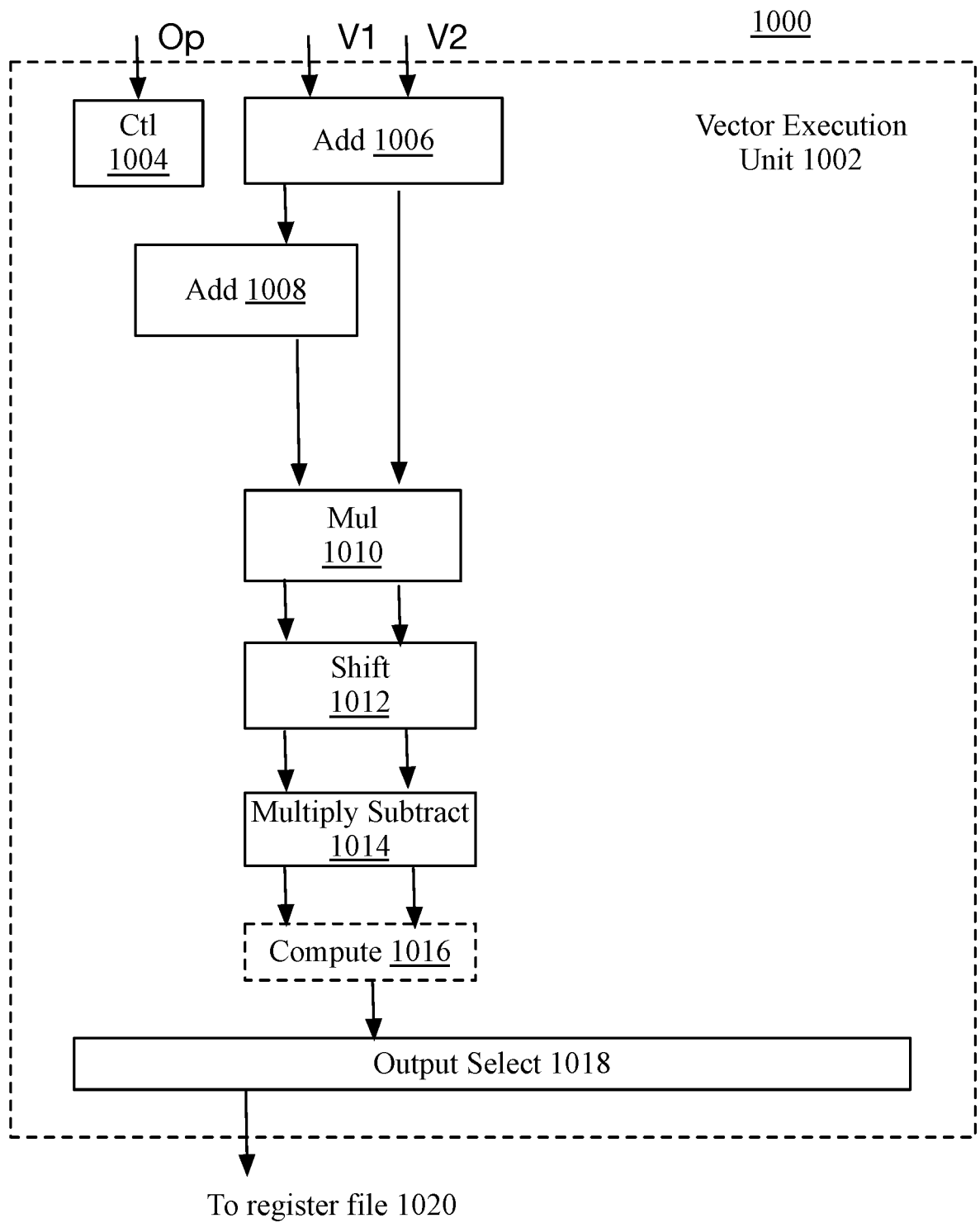
FIG. 10 is a block diagram of one embodiment of a vector execution unit.

FIG. 10 is a block diagram 1000 of one embodiment of a vector execution unit 216 shown in FIG. 2, including circuitry configured to execute various assist instructions. The circuitry shown in FIG. 10 may include circuitry that is shared with other types of vector operations and/or circuitry that is dedicated to the assist instructions, or any combination thereof. The vector execution unit 1002 is coupled to inputs for the op to be executed, as well as the source operands V1 and V2. The result operation may be specified as part of the op and may be forwarded with the result to the register file 214.

A control circuit 1004 may receive the op and may control the other circuitry in the vector execution unit 218 accordingly. Thus, the control circuit 1004 may be coupled to the other circuitry shown in FIG. 10, although the connections are not expressly illustrated in FIG. 10 to avoid complicating the drawing. An adder circuit 1006 may be provided, which may be coupled to the second source operand V2. The adder circuit 1006 may be configured to add various elements of the vector V1 and the V2. For example, V1 may be an adler variable for the adler16 instruction that is computed with (Vn.b[0]+Vn.b[1]++Vn.b[15]) in the result vector Vd.s[0], where Vn=V1. In another example, an adler variable of the adler32 instruction is computed with (Vn.b[0]+.+Vn.b[15]+Vm.b[0]+.+Vm.b[15]) in the result vector Vd.s[0], where Vn=V1 and Vm=V2.

Similarly, the adder circuit 1008 may be configured to add various elements of the vector V1, V2, and the generated adler variable Vd.s[0]. For example, the sum2 variable for the adler16 instruction is computed with (16*Vd.s[0]+16*Vn.b[0]+ . . . +1*Vn.b[15]) in the result vector Vd.s[1], where Vn=V1. In another example, the sum2 variable for the adler32 is computed with (32*Vd.s[0]+32*Vn.b[0]+ . . . +1*Vm.b[15]) in the result vector Vd.s[1], where Vn=V1 and Vm=V2.

The mod_base modulo operations may be performed on the adler and the sum2 results in the result vectors Vd.s[0] and Vd.s[1] with the multiply circuit 1010, shift circuit 1012, and multiply subtract circuit 1014.

Optionally, compute circuit 1016 may be provided to compute the datum with a concat instructions/ops. The compute circuit 1016 may be coupled to the multiply subtract circuit 1014 and may receive the modulo of the adler and sum2 variables to compute the datum. In other embodiments, the output to the register file may be the adler and sum2 variable values.

The output select circuit 1018 shown in FIG. 10 may be coupled to the compute circuit and may be configured to select among the outputs based on the op being performed to provide an output to the register file 1020.

Figure 11:
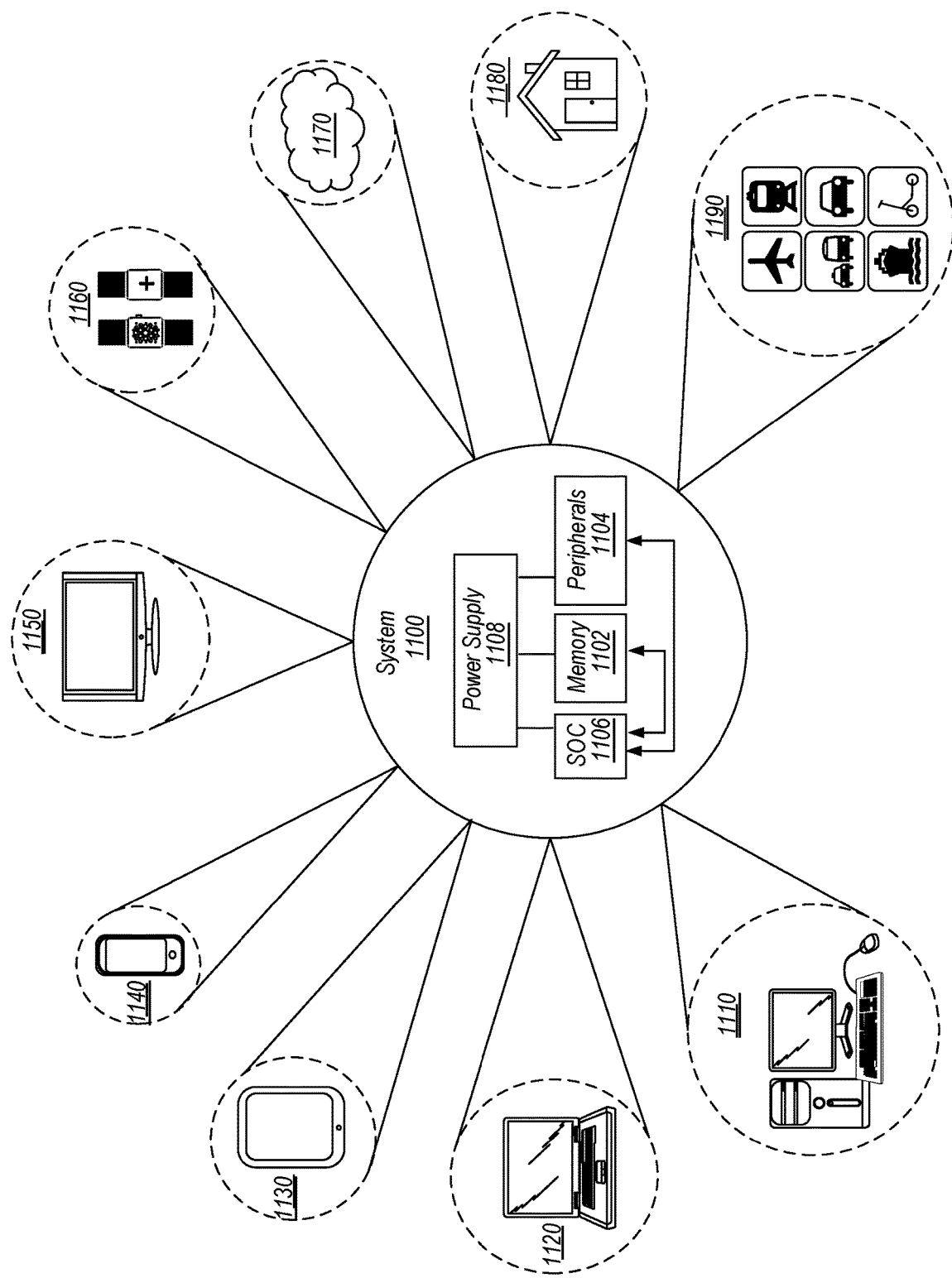
FIG. 11 is a block diagram of one embodiment of a system, in accordance with an embodiment.

Turning next to FIG. 11, a block diagram of one embodiment of a system 1100 is shown. In the illustrated embodiment, the system 1100 includes at least one instance of a system on a chip (SOC) 1106 coupled to one or more peripherals 1104 and an external memory 1102. A power supply (PMU) 1108 is provided which supplies the supply voltages to the SOC 1106 as well as one or more supply voltages to the memory 1102 and/or the peripherals 1104. In some embodiments, more than one instance of the SOC 1106 may be included (and more than one memory 1102 may be included as well). The memory 1102 may include the memories 208 illustrated in FIG. 2, in an embodiment.

The peripherals 1104 may include any desired circuitry, depending on the type of system 1100. For example, in one embodiment, the system 1100 may be a mobile device (e.g., personal digital assistant (PDA), smart phone, etc.) and the peripherals 1104 may include devices for various types of wireless communication, such as Wi-Fi, Bluetooth, cellular, global positioning system, etc. The peripherals 1104 may also include additional storage, including RAM storage, solid state storage, or disk storage. The peripherals 1104 may include user interface devices such as a display screen, including touch display screens or multitouch display screens, keyboard or other input devices, microphones, speakers, etc. In other embodiments, the system 1100 may be any type of computing system (e.g., desktop personal computer, laptop, workstation, net top etc.).

The external memory 1102 may include any type of memory. For example, the external memory 1102 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 1102 may include one or more memory modules to which the memory devices are mounted, such as single inline memory modules (SIMMs), dual inline memory modules (DIMMs), etc. Alternatively, the external memory 1102 may include one or more memory devices that are mounted on the SOC 1106 in a chip-on-chip or package-on-package implementation.

As illustrated, system 1100 is shown to have application in a wide range of areas. For example, system 1100 may be utilized as part of the chips, circuitry, components, etc., of a desktop computer 1110, laptop computer 1120, tablet computer 1130, cellular or mobile phone 1140, or television 1150 (or set-top box coupled to a television). Also illustrated is a smartwatch and health monitoring device 1160. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1100 may further be used as part of a cloud-based service(s) 1170. For example, the previously mentioned devices, and/or other devices, may access computing resources in the cloud (i.e., remotely located hardware and/or software resources). Still further, system 1100 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also, the application of system 1100 to various modes of transportation. For example, system 1100 may be used in the control and/or entertainment systems of aircraft, trains, buses, cars for hire, private automobiles, waterborne vessels from private boats to cruise liners, scooters (for rent or owned), and so on. In various cases, system 1100 may be used to provide automated guidance (e.g., self-driving vehicles), general systems control, and otherwise. These any many other embodiments are possible and are contemplated. It is noted that the devices and applications illustrated are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must). The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical), More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however, After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph, in many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that e decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

In utilizing the various aspects of the embodiments, it would become apparent to one skilled in the art that combinations or variations of the above embodiments are possible for forming a fan out system in package including multiple redistribution layers. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A processor comprising:
a register file comprising a plurality of vector registers; and
an execution core coupled to the register file, wherein the execution core is configured to execute a set of checksum instructions, wherein a first checksum instruction from the set of checksum instructions to specify a first vector operand, a second vector operand, and a result vector operand, wherein the first vector operand is in a first vector register of the plurality of vector registers, the second vector operand is in a second register of the plurality of vector registers, and the result vector operand is to be written to a third vector register of the plurality of vector registers, wherein to execute the first checksum instruction, the execution core is further configured to:
accumulate bytes from the first vector operand and the second vector operand into a first portion of the result vector operand and add the accumulated bytes from the first vector operand and the second vector operand to a previously generated value for a second portion of the result vector operand to generate the second portion written to the result vector operand, and wherein the execution core is further configured to:
execute the first checksum instruction consecutively with a block from a set of consecutive blocks from a data source, wherein each block from the set of consecutive blocks has a defined number of bytes, and wherein the execution of the first checksum instruction with the block generates the result vector operand; and
execute a second checksum instruction, wherein the execution core is further configured to:
specify a third vector operand, a fourth vector operand, and a second result vector operand, wherein the third vector operand is in a fourth vector register of the plurality of vector registers, the fourth vector operand is in a fifth register, and the second result vector operand is to be written to a sixth vector register of the plurality of vector registers, wherein the execution core is configured to:
multiply a first portion of vector elements of a third vector operand by at least one vector element of a fourth vector operand to generate a vector written to the second result vector operand;
shift the second result vector operand by a defined value, wherein the defined value is computed to prevent overflow; and
multiply the second result vector operand by at least one vector element of the fourth vector operand to generate a subtraction value and subtracting the second result vector operand by the subtraction value.

2. The processor of claim 1, wherein the first vector operand is a source vector of bytes from a data source buffer.

3. The processor of claim 1, wherein the execution core is further configured to execute a third checksum instruction from the set of checksum instructions, wherein to execute the third checksum instruction, the execution core is further configured to:
specify a fifth vector operand, and a third result vector operand, wherein the fifth vector operand is in a seventh vector register of the plurality of vector registers and the third result vector operand is to be written to a eighth vector register of the plurality of vector registers, wherein the execution core is configured to accumulate bytes from the fifth vector operand into a first portion of the third result vector operand and add the accumulated bytes in the first portion of the third result vector to the second portion of the third result vector operand to generate the second portion written to the third result vector operand.

4. The processor of claim 1, wherein concatenating the first portion of the result vector operand and the second portion of the result vector operand generates a checksum result, the checksum result comprises a computation for a fixed size datum.

5. The processor of claim 2, wherein the data source buffer is compressed data.

6. The processor of claim of 1,
wherein the execution of the first checksum instruction with the block to generate the result vector written to the fourth vector register of the register file; and execute the second checksum instruction in response to completing the consecutive execution of the first checksum instruction with the block.

7. A non-transitory machine-readable medium storing instructions executed to cause one or more processors of a data processing system to perform operations, the instructions comprising:
a first checksum instruction from a set of checksum instructions configured to execute, the first checksum instruction specifying a first vector operand, a second vector operand, and a result vector operand, wherein the first vector operand is in a first vector register of a plurality of vector registers, the second vector operand is in a second register of the plurality of registers, and the result vector operand is to be written to a third vector register of the plurality of vector registers, wherein to execute the first checksum instruction, an execution core is further configured to:
accumulate bytes from the first vector operand and the second vector operand into a first portion of the result vector operand and add the accumulated bytes from the first vector operand and the second vector operand to a previously generated value for a second portion of the result vector operand to generate the second portion written to the result vector operand and wherein the execution core is further configured to:
execute the first checksum instruction consecutively with a block from a set of consecutive blocks from a data source, wherein each block from the set of consecutive blocks has a defined number of bytes, and wherein the execution of the first checksum instruction with the block generates the result vector operand; and
execute a second checksum instruction, wherein the execution core is further configured to:
specify a third vector operand, a fourth vector operand, and a second result vector operand, wherein the third vector operand is in a fourth vector register of the plurality of vector registers, the fourth vector operand is in a fifth register, and the second result vector operand is to be written to a sixth vector register of the plurality of vector registers, wherein the execution core is configured to:
multiply a first portion of vector elements of a third vector operand by at least one vector element of a fourth vector operand to generate a vector written to the second result vector operand;
shift the second result vector operand by a defined value, wherein the defined value is computed to prevent overflow; and
multiply the second result vector operand by at least one vector element of the fourth vector operand to generate a subtraction value and subtracting the second result vector operand by the subtraction value.

8. The non-transitory machine-readable medium of claim 7, wherein the first vector operand is a source vector of bytes from a data source buffer.

9. The non-transitory machine-readable medium of claim 7, the instructions further comprising a third checksum instruction from the set of checksum instructions, wherein to execute the third checksum instruction, the execution core is further configured to:
specify a fifth vector operand, and a third result vector operand, wherein the fifth vector operand is in a seventh vector register of the plurality of vector registers and the third result vector operand is to be written to a eighth vector register of the plurality of vector registers, wherein the second checksum instruction is configured to:
accumulate bytes from the fifth vector operand into a first portion of the third result vector operand and add the accumulated bytes in the first portion of the third result vector to the second portion of the third result vector operand to generate the second portion written to the third result vector operand.

10. The non-transitory machine-readable medium of claim 7, wherein concatenating the first portion of the result vector operand and the second portion of the result vector operand generates a checksum result, the checksum result comprises a computation for a fixed size datum.

11. The non-transitory machine-readable medium of claim 8, wherein the data source buffer is compressed data.

12. The non-transitory machine-readable medium of claim 7, wherein the operations further comprise:
execute the third checksum instruction with remaining data from the block after consecutive execution of the first checksum instruction, wherein consecutive execution of the first checksum instruction and the third checksum instruction for the block is done in a single cycle.

13. The non-transitory machine-readable medium of claim 12, wherein the execution of the first checksum instruction with the block to generate the result vector written to the fourth vector register of the register file; and
execution of the third checksum instruction in response to completing the consecutive execution of the first checksum instruction with the block.

14. The non-transitory machine-readable medium of claim 12, wherein the defined number of bytes is 5552 bytes.

15. The non-transitory machine-readable medium of claim 10, wherein the checksum result is compared to a received datum.

* * * * *